Dec. 12, 1950 — C. D. PALMER — 2,533,617
BAITLESS TRAP FOR MINNOWS AND SMALL FISH
Filed July 9, 1948 — 2 Sheets-Sheet 1
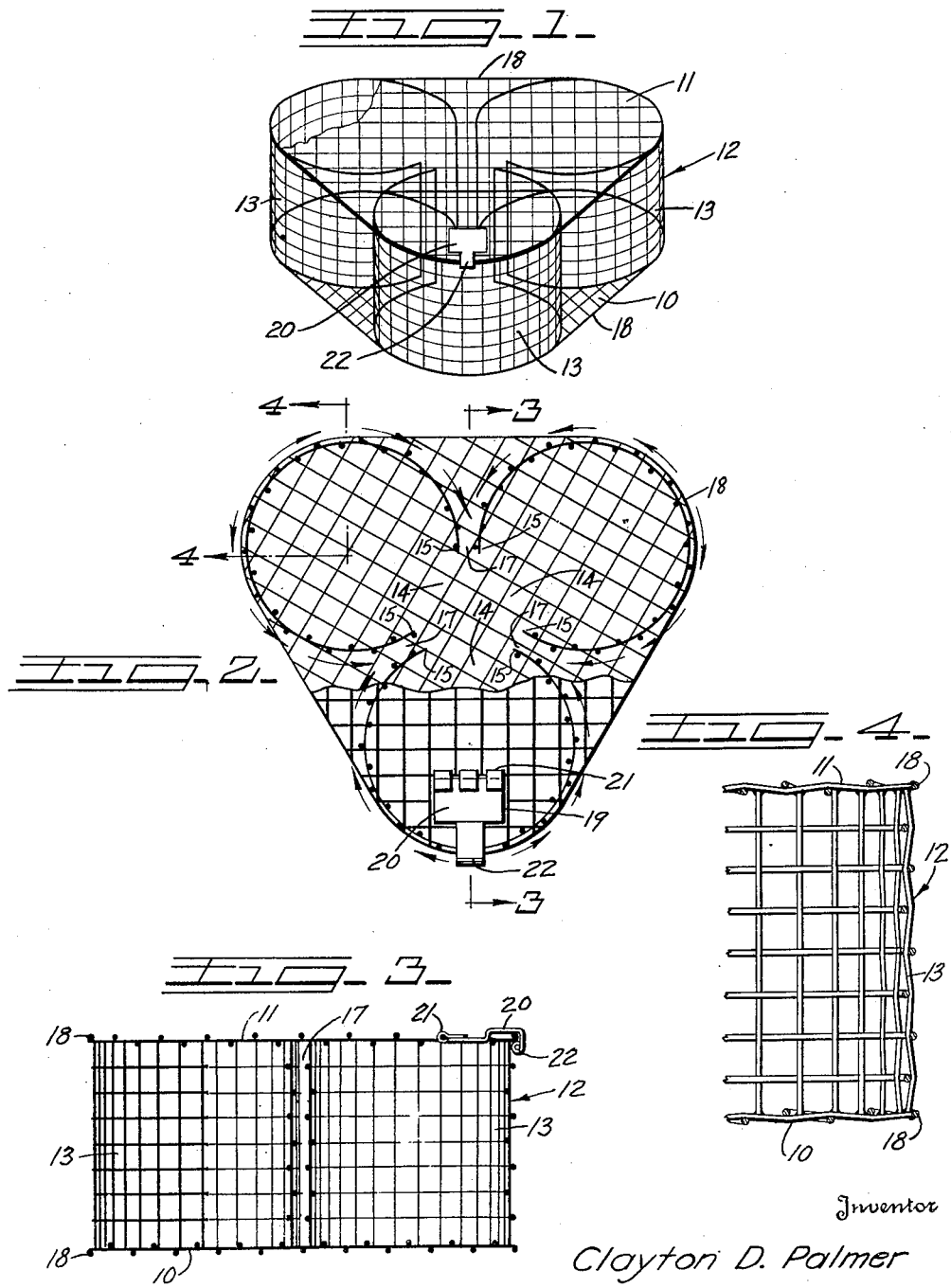
Inventor
Clayton D. Palmer

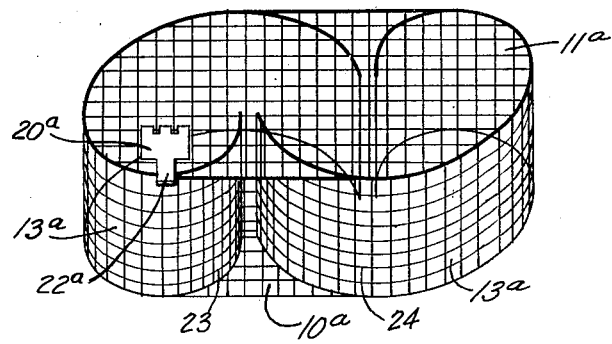
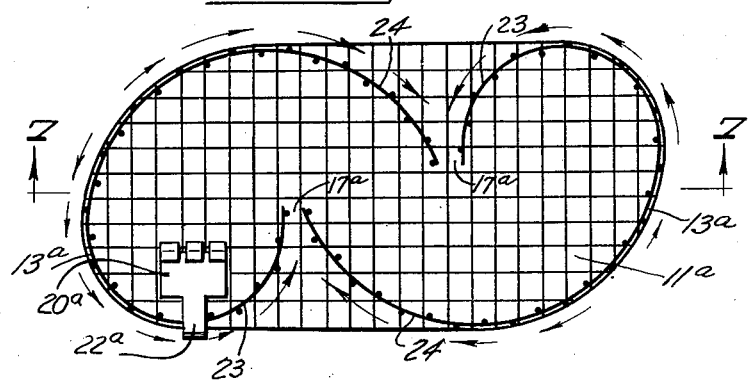
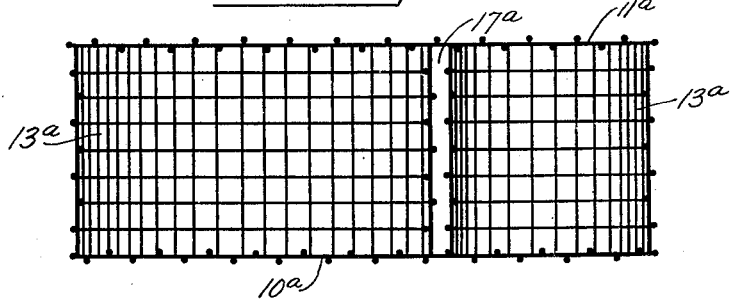

Patented Dec. 12, 1950

2,533,617

UNITED STATES PATENT OFFICE 2,533,617

BAITLESS TRAP FOR MINNOWS AND SMALL FISH

Clayton D. Palmer, Albert Lea, Minn.

Application July 9, 1948, Serial No. 37,843

3 Claims. (Cl. 43—100)

My invention relates to fish traps and, particularly, to those intended to catch minnows and similar small fish.

I have observed that minnows and other small fish have a tendency to swim around and close to any curved obstruction that may be in their path, especially in relatively still water such as ponds, lakes and slow-moving streams or other bodies of water. I take advantage of this swimming habit of such fish in making an improved trap in accordance with my invention.

The principal object of the invention is to provide a trap which may be used in quiet waters without the use of any bait to attract the minnows or other small fish.

Another object is to provide a trap of this character which is simple in construction and may be manufactured at a low cost, which is strong and durable, and which is highly effective in operation.

Other objects and advantages will become apparent from the following detailed description of preferred embodiments of the invention in connection with the accompanying drawings in which:

Figure 1 is a perspective view of one form of the trap, a portion of the top of the trap being broken away.

Fig. 2 is a top plan view of the same with portions broken away.

Fig. 3 is a vertical section on line 3—3 of Fig. 2.

Fig. 4 is an enlarged detail section on line 4—4 of Fig. 2.

Fig. 5 is a perspective view of another form of the invention.

Fig. 6 is a top plan view of the trap shown in Fig. 5.

Fig. 7 is a vertical section on line 7—7 of Fig. 6.

Referring to Figs. 1 through 4, it will be seen that the trap comprises a body consisting of a flat bottom 10, a flat top 11 and a vertical or upright side wall generally indicated by the numeral 12 and all portions of which are continuously curved longitudinally or in the direction of the length of the wall. In this form of the invention, the top and bottom are of generally triangular shape with rounded points or angles and the side wall is composed of three upright open cylindrical sections 13 arranged in triangular relation with their open portions 14 facing inwardly. These openings 14 are relatively wide, as shown in Fig. 2, and place the interiors of the three sections 13 in communication with each other to form a single trap chamber. The vertical edges 15 of adjacent sections 13 are spaced from each other to form entrance openings 17 which extend vertically from the bottom 10 to the top 11. It will be seen that the portions of adjacent sections 13 adjacent the openings 14 converge inwardly toward each other to direct minnows swimming along the side wall into one or the other of the entrance openings 17.

The sections 13 forming the side wall are made of some rigid transparent sheet material so that minnows within the trap chamber swimming around the curved wall sections may be seen by minnows outside of the trap and will have a tendency to follow the trapped minnows and, hence, will be directed to one or another of the entrance openings. I preferably make the side wall of square-mesh woven wire commonly called hardware cloth or some similar open-mesh or reticulate material. The size of the trap and the size of the openings in the material will depend upon the size of the fish to be trapped. For minnows and similar small fish, I have found traps of the form shown in Fig. 1 to be highly effective when the three sections 13 had a diameter of 19 inches and a height of 15 inches and were so spaced that the entrance openings 17 were three-quarters of an inch wide. The bottom 10 and top 11 may be made of solid material such as sheet metal, but I preferably employ hardware cloth and reenforce the edges with a wire 18 soldered to the ends of the woven strands of the cloth. The ends of the vertical strands of the material of the three sections 13 may be soldered or otherwise secured to the top and bottom so that all parts of the trap are rigid and a strong and durable structure is provided.

To permit the trapped minnows to be removed, an opening 19 may be formed in the top 11 and closed by a cover 20 hinged at 21 and provided with a suitable fastener as shown at 22 in Figs. 1 and 3. In Figs. 1, 2, and 3 the trap is shown more or less diagrammatically but in Fig. 4 the woven mesh fabric is shown in double lines and not to any particular scale.

The trap may be placed on the bottom of the lake or other body of relatively quiet water or it may be suitably suspended in a horizontal position at any desired depth. I have found from numerous tests that a trap of the above described construction is exceedingly effective in trapping minnows and other small fish without the use of any bait or lure in the trap. The swimming habits of such fish cause them to swim along the curved side wall of the trap and they are thus directed into one or the other of the entrance openings. When within the trap body, they likewise swim along the inner sides of the curved wall sections and are not likely to pass out of the entrance openings. Minnows on the outside have a tendency to follow those on the inside and are thus directed into one or another of the entrance openings.

The form of the invention shown in Figs. 5, 6 and 7 is similar in construction and operation to the form above described, but the bottom 10ª and top 11ª are of generally oval shape and only two side wall sections 13ª are employed. These sections 13ª are continuously curved in the direction of their length, being of generally spiral shape and each having a short radius portion 23 at one end and a long radius portion 24 at the other end. These spiral sections 13ª are so arranged that the vertical edges of the short and long radius portions are spaced from each other to provide two entrance openings 17ª into which the minnows are directed by the adjacent converging portions of the sections as indicated by the arrows in Fig. 6. It will be noted that the sections are in opposed relation with the short radius portions disposed adjacent to the smaller or rounded ends of the bottom and top, and that the space between the sections form the trap chamber. Since all portions of the side wall are continuously curved from one entrance opening to the other, this form of the trap will produce the same advantages as the form first described. In this form of the invention the top of the trap is also formed with an outlet opening normally closed by a hinged cover 20ª held closed by a suitable fastening means 22ª.

It will be noted that in both forms of the invention the side wall is composed of at least two separate pieces of reticulate material which are continuously curved in the same direction and have their concave faces in substantially opposed relation to provide a single trap chamber. Further the two pieces have their ends spaced to provide at least two entrance openings which are disposed adjacent the central portion of the trap chamber and are remotely spaced from the side wall portions that are directly opposite said entrance openings. Consequently as the minnows swim along the convex outer faces of the curved side wall and approach the entrance openings they will not see or recognize as obstructions in their paths the remote side wall portions which are in line with or directly opposite the entrance openings.

I claim:

1. A minnow trap for use in still water comprising a body having a top, a bottom, and a side wall composed of at least two separate pieces of reticulate material disposed between said top and bottom and continuously curved in the same direction from end to end, said pieces having their ends spaced apart to provide at least two vertical entrance openings each having a width of approximately three-quarters of an inch, said two pieces having their concaved sides in substantially opposed relation to form with said top and bottom a single trap chamber in said body, said entrance openings being disposed adjacent to the central portion of said trap chamber and in widely spaced relation to the portions of said side wall that are directly opposite said entrance openings, whereby minnows swimming along the convex outer faces of said side wall and approaching said entrance openings will not recognize the side wall portions directly opposite the entrance openings as obstructions and will not be thereby deterred from entering the trap chamber through said entrance openings.

2. A trap of the character described for use in still water, comprising a body having a substantially triangular shaped top, a substantially triangular shaped bottom and an upright side wall between and united to said top and bottom, said side wall consisting of three open cylindrical sections of reticulate material disposed in triangular relation between said top and bottom with their openings disposed inwardly toward the inner portion of the body, the three sections forming a single trap chamber, the vertical edges of the openings of each two adjacent side wall sections being closely spaced from each other to form narrow entrance openings for the trap, whereby all exterior portions of said side wall will be continuously curved and will tend to direct minnows swimming along the wall into said entrance openings.

3. A trap of the character described for use in still water, comprising a body having a substantially oval-shaped top, a substantially oval-shaped bottom, and an upright side wall between and united to said top and bottom, said side wall consisting of two generally spiral-shaped sections of reticulate material, each of said sections having a portion of short radius and a portion of long radius with the short radius portions disposed at the small ends of said oval-shaped top and bottom, said sections having the vertical edges of their short radius portions disposed in closely spaced relation to the vertical edges of the long radius portions to provide two restricted entrance openings on opposite sides of the trap, whereby said side wall will present continuously curved outer surfaces extending from one entrance opening to the other to direct minnows swimming along the wall into one or the other of said entrance openings.

CLAYTON D. PALMER.

REFERENCES CITED

The following references are of record in the file of this patent:

FOREIGN PATENTS

| Number | Country | Date |
|---|---|---|
| 32,122 | Norway | May 1, 1919 |